United States Patent
Samson et al.

(10) Patent No.: US 10,241,229 B2
(45) Date of Patent: Mar. 26, 2019

(54) DISTRIBUTED FEEDBACK FIBER LASER STRAIN SENSOR SYSTEMS AND METHODS FOR SUBSURFACE EM FIELD MONITORING

(71) Applicant: Halliburton Energy Services, Inc. ("HESI"), Duncan, OK (US)

(72) Inventors: Etienne M. Samson, Cypress, TX (US); Tasneem A. Mandviwala, Katy, TX (US); Michel J. Leblanc, Houston, TX (US); Han-Sun Choi, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 1160 days.

(21) Appl. No.: 13/756,601

(22) Filed: Feb. 1, 2013

(65) Prior Publication Data

US 2014/0222343 A1 Aug. 7, 2014

(51) Int. Cl.
*G01V 3/12* (2006.01)
*G01V 8/10* (2006.01)

(52) U.S. Cl.
CPC . *G01V 8/10* (2013.01); *G01V 3/12* (2013.01)

(58) Field of Classification Search
CPC ....................................................... G01V 8/10
USPC ............................................................ 702/8
See application file for complete search history.

(56) References Cited

U.S. PATENT DOCUMENTS

| | | | |
|---|---|---|---|
| 4,360,272 A | 11/1982 | Schmadel et al. | |
| 4,589,285 A * | 5/1986 | Savit | G01H 9/004 367/149 |
| 4,939,447 A | 7/1990 | Bohnert et al. | |
| 4,950,883 A | 8/1990 | Glenn et al. | |
| 4,996,419 A | 2/1991 | Morey et al. | |
| 5,305,075 A | 4/1994 | Bucholtz et al. | |
| 5,317,576 A | 5/1994 | Leonberger et al. | |
| 5,511,083 A | 4/1996 | D'Amato | |
| 5,513,913 A | 5/1996 | Ball et al. | |
| 5,642,051 A | 6/1997 | Babour et al. | |
| 5,675,674 A * | 10/1997 | Weis | E21B 47/123 250/227.18 |
| 5,691,999 A | 11/1997 | Ball et al. | |
| 5,804,736 A | 9/1998 | Klauder et al. | |
| 5,844,927 A | 12/1998 | Kringlebotn | |

(Continued)

FOREIGN PATENT DOCUMENTS

| | | |
|---|---|---|
| EP | 0212915 A2 | 3/1987 |
| EP | 0856753 A1 | 5/1998 |

(Continued)

OTHER PUBLICATIONS

Cranch et al., Distributed Feedback Fiber Laser Strain Sensors, IEEE Sensors Journal, vol. 8, No. 7, Jul. 2008.*

(Continued)

*Primary Examiner* — Manuel L Barbee
*Assistant Examiner* — Raymond L Nimox
(74) *Attorney, Agent, or Firm* — Gilliam IP PLLC

(57) ABSTRACT

A disclosed subsurface electromagnetic field monitoring system includes at least one fiberoptic cable to optically communicate measurements from an array of electromagnetic field sensors in a borehole. The array of electromagnetic field sensors includes a distributed feedback fiber laser strain sensor with electromagnetic field sensitivity.

29 Claims, 4 Drawing Sheets

(56) References Cited

U.S. PATENT DOCUMENTS

| | | | |
|---|---|---|---|
| 5,898,517 A * | 4/1999 | Weis | E21B 47/123 |
| | | | 356/32 |
| 6,188,712 B1 | 2/2001 | Jiang et al. | |
| 6,268,911 B1 * | 7/2001 | Tubel | E21B 23/03 |
| | | | 250/256 |
| 6,271,766 B1 | 8/2001 | Didden et al. | |
| 6,325,153 B1 * | 12/2001 | Harrell | E21B 34/066 |
| | | | 166/324 |
| 6,433,543 B1 * | 8/2002 | Shahinpoor | G01R 33/0327 |
| | | | 324/244.1 |
| 6,534,986 B2 | 3/2003 | Nichols | |
| 6,597,481 B1 * | 7/2003 | Fatehi | G02B 6/022 |
| | | | 398/79 |
| 6,630,658 B1 | 10/2003 | Bohnert et al. | |
| 6,731,114 B1 | 5/2004 | Lagabrielle et al. | |
| 6,961,601 B2 | 11/2005 | Matthews et al. | |
| 7,077,200 B1 | 7/2006 | Adnan et al. | |
| 7,183,777 B2 | 2/2007 | Bristow et al. | |
| 7,391,942 B2 | 6/2008 | Loock et al. | |
| 7,492,168 B2 | 2/2009 | Ogilvy et al. | |
| 7,673,682 B2 | 3/2010 | Daily | |
| 8,058,869 B2 | 11/2011 | Cranch et al. | |
| 8,098,967 B1 * | 1/2012 | Bazzone | G01J 1/0492 |
| | | | 250/227.11 |
| 8,165,178 B2 | 4/2012 | Henderson et al. | |
| 8,380,439 B2 | 2/2013 | Lagmanson et al. | |
| 9,557,439 B2 | 1/2017 | Wilson et al. | |
| 9,651,706 B2 | 5/2017 | Mandviwala et al. | |
| 2002/0063866 A1 | 5/2002 | Kersey et al. | |
| 2002/0182589 A1 * | 12/2002 | Knudsen | G01D 5/353 |
| | | | 435/4 |
| 2003/0038634 A1 | 2/2003 | Strack | |
| 2003/0094281 A1 * | 5/2003 | Tubel | E21B 47/00 |
| | | | 166/250.03 |
| 2003/0205083 A1 | 11/2003 | Tubel et al. | |
| 2004/0033017 A1 | 2/2004 | Kringlebotn et al. | |
| 2004/0056663 A1 | 3/2004 | Sinclair et al. | |
| 2004/0093950 A1 | 5/2004 | Bohnert | |
| 2004/0117119 A1 | 6/2004 | West et al. | |
| 2006/0250274 A1 | 11/2006 | Mombourquette et al. | |
| 2007/0126594 A1 * | 6/2007 | Atkinson | E21B 47/123 |
| | | | 340/853.1 |
| 2007/0228288 A1 | 10/2007 | Smith | |
| 2008/0042636 A1 | 2/2008 | Koste et al. | |
| 2008/0317400 A1 * | 12/2008 | Petrov | G02B 6/124 |
| | | | 385/10 |
| 2009/0058422 A1 * | 3/2009 | Tenghamn | G01V 3/083 |
| | | | 324/337 |
| 2009/0102474 A1 * | 4/2009 | Cranch | A01D 89/008 |
| | | | 324/244.1 |
| 2009/0188665 A1 | 7/2009 | Tubel et al. | |
| 2009/0296755 A1 | 12/2009 | Brown et al. | |
| 2010/0224362 A1 | 9/2010 | Carazzone | |
| 2010/0271030 A1 | 10/2010 | Reiderman et al. | |
| 2011/0017512 A1 | 1/2011 | Cidazzu | |
| 2011/0083838 A1 | 4/2011 | Labrecque | |
| 2011/0084696 A1 | 4/2011 | Tenghamn et al. | |
| 2011/0139447 A1 | 6/2011 | Ramos et al. | |
| 2011/0163891 A1 | 7/2011 | Wilson et al. | |
| 2012/0086947 A1 * | 4/2012 | Bazzone | G01K 11/3206 |
| | | | 356/477 |
| 2012/0147924 A1 | 6/2012 | Hall | |
| 2012/0175513 A1 | 7/2012 | Duncan et al. | |
| 2012/0176250 A1 * | 7/2012 | Duncan | G01V 11/002 |
| | | | 340/853.2 |
| 2012/0223717 A1 | 9/2012 | Labrecque | |
| 2012/0293179 A1 | 11/2012 | Colombo et al. | |
| 2013/0056197 A1 | 3/2013 | Maida et al. | |
| 2013/0118734 A1 * | 5/2013 | Csutak | E21B 49/10 |
| | | | 166/264 |
| 2013/0249705 A1 | 9/2013 | Sharp et al. | |
| 2013/0279841 A1 | 10/2013 | Joinson | |
| 2014/0036628 A1 | 2/2014 | Hill et al. | |
| 2014/0191761 A1 | 7/2014 | San Martin et al. | |

| | | |
|---|---|---|
| 2016/0259085 A1 | 9/2016 | Wilson et al. |
| 2016/0334534 A1 | 11/2016 | Mandviwala et al. |
| 2017/0082770 A1 | 3/2017 | Mandviwala et al. |
| 2017/0123096 A1 | 5/2017 | Wilson et al. |

FOREIGN PATENT DOCUMENTS

| | | |
|---|---|---|
| WO | WO2008/124286 | 10/2008 |
| WO | WO2012/061844 | 5/2012 |
| WO | WO2012/075474 | 6/2012 |
| WO | 2012/100217 | 7/2012 |
| WO | 2014/120305 | 8/2014 |
| WO | 2015/130298 | 9/2015 |
| WO | 2015/178876 | 11/2015 |
| WO | 2015/178878 | 11/2015 |

OTHER PUBLICATIONS http://www.piezo.com/tech2intropiezotrans.html.*
https://eng.libretexts.org/Core/Materials_Science/Magnetic_Properties/Magnetostriction.*
Ball, G A., et al., "Single- and Multipoint Fiber-Laser Sensors", IEEE Photonics Technology Letters, vol. 5, No. 2, (Feb. 1993), 4 pgs.
Bhatia, Vikram et al., "Optical Fiber Long-Period Grating Sensors", Optics Letter, vol. 21, No. 9, (May 1, 1996), 3 pgs.
Cranch, Geoffrey A., "Distributed Feedback Fiber Laser Strain Sensors", IEEE Sensors Journal, vol. 8, No. 7, (Jul. 2008), 12 pgs.
Mandviwala, Tasneem A., "Well Monitoring with Optical Electromagnetic Sensors", U.S. Appl. No. 13/679,926, filed Nov. 16, 2012, 28 pgs.
"AU Examination Report", dated Feb. 9, 2016 Distributed Feedback Fiber Laser Strain Sensor Systems and Method for Subsurface EM Field Monitoring Appln No. 2013376922 filed Feb. 1, 2013, 4 pgs.
"International Preliminary Report on Patentability", dated Aug. 14, 2015 A Magnetic Induction Sensor With an Electro-Optical Transducer and Relayed Methods and Systems Appln. No. PCT/US2014/038542 filed May 19, 2014, 16 pgs.
"International Preliminary Report on Patentability", dated Aug. 13, 2015, Appl No. PCT/US2013/067288, "Distributed Feedback Fiber Laser Strain Sensor Systems and Methods for Subsurface EM Field Monitoring," Filed Oct. 29, 2013, 9 pgs.
"PCT International Search Report and Written Opinion", dated Nov. 5, 2014, Appl No. PCT/US2014/019228, "Optical Electric Field Sensors Having Passivated Electrodes," Filed Feb. 28, 2014, 14 pgs.
"PCT Written Opinion", dated Jan. 12, 2014, Appl No. PCT/US2013/067288, "Distributed Feedback Fiber Laser Strain Sensor Systems and Methods for Subsurface EM Field Monitoring," Filed Oct. 29, 2013, 16.
"PCT_International_Search_Report_and_Written_Opinion", dated Feb. 17, 2015, Appl No. PCT/US2014/083552, "Optical Magnetic Field Sensor Units for a Downhole Environment," filed May 19, 2015, 15 pgs.
"PCT_International_Search_Report_and_Written_Opinion", dated Feb. 4, 2015, Appl No. PCT/US2014/038542, "A Magnetic Induction Sensor with an Electro-Optical Transducer and Related Methods and Systems," Filed May 19, 2014, 17 pgs.
Bergmann, Peter et al., "Surface-Downhole Electrical Resistivity Tomography Applied to Monitoring of CO2 Storage at Ketzin, Germany", Geophysics, vol. 77, No. 6, Nov.-Dec. 2012, pp. B253-B267.
Bristow, Q. et al., "A New Temperature, Capacitive-Resistivity, and Magnetic-Susceptibility Borehole Probe for Mineral Exploration, Groundwater, and Environmental Applications", Geological Survey of Canada, Technical Note No. 3, doi: 10.4095/289197, 2011, 13pgs.
Carrigan, Charles R. et al., "Electrical resistance tomographic monitoring of CO2 movement in deep geologic reservoirs", International Journal of Greenhouse Gas Control, doi: 10.1016/j.ijggc.2013.04.016, 2013, pp. 401-408.

(56) References Cited

OTHER PUBLICATIONS

Deceuster, John et al., "Automated Identification of Changes in Electrode Contact Properties for Long-Term Permanent ERT Monitoring Experiments", Geophysics, vol. 78, No. 2 (Mar.-Apr. 2013), 2011, pp. E79-E94.
Douma, Marten et al., "A Capacitive-Coupled Ground Resistivity System for Engineering and Environmental Applications: Results of Two Canadian Field Pests", SEG Annual Meeting, Expanded Abstracts, 1994, pp. 559-561.
Grard, R. et al., "A Mobile Four-Electrode Array and its Application to the Electrical Survey of Planetary Grounds at Shallow Depths", Journal of Geophysical Research, vol. 96, No. B3, Mar. 10, 1991, pp. 4117-4123.
Hibbs, A. D. et al., "Capacitive Electric Field Measurements for Geophysics", EAGE Conference and Exhibition incorporating SPE EUROPEC 2011, Vienna, Austria, Expanded Abstracts, 2011, 2 pgs.
Hibbs, Andrew et al., "New Electromagnetic Sensors for Magnetotelluric and Induced Polarization Geophysical Surveys", SEG Annual Meeting, Expanded Abstracts, 2012, 5 pgs.
Kiessling, Dana et al., "Geoelectrical Methods for Monitoring Geological CO2 Storage: First Results From Cross-Hole and Surface-Downhole Measurements From the CO2SINK Pest Site at Ketzin (Germany)", International Journal of Greenhouse Gas Control, Apr. 2010, pp. 816-826.
Kuras, Oliver et al., "Capacitive Resistivity Imaging With Towed Arrays", Journal of Engineering and Environmental Geophysics, vol. 12, Issue 3, 2007, pp. 267-279.
Kuras, Oliver et al., "Fundamentals of the Capacitive Resistivity Technique", Geophysics, vol. 71, No. 3 (May-Jun. 2006), 2006, pp. G135-G152.
Labrecque, Douglas et al., "Assessment of Measurement Errors for Galvanic-Resistivity Electrodes of Different Composition", Geophysics, vol. 73, No. 2 (Mar.-Apr. 2008), 2008, pp. F55-F64.
MacNae, James, "Electric Field Measurements in Air", SEG Annual Meeting, Expanded Abstracts, 2010, pp. 1773-1777.
MacNae, James et al., "Near-Surface Resistivity Contast Mapping With a Capacitive Sensor Array and an Inductive Source", Geophysics, vol. 76, No. 2, (Mar.-Apr. 2011), 2011, pp. G13-G23.
Mwenifumbo, C. J. et al., "Field Evaluation of a New Borehole Resistivity Probe Using Capacitive Electrodes", Proceedings of the Symposium on the Applications of Geophysics to Engineering and Environmental Problems, 1999, pp. 859-867.
Mwenifumbo, C. Jonathan et al., "Capacitive Conductivity Logging and Electrical Stratigraphy in a High-Resistivity Aquifer, Boise Hydrogeophysical Research Site", Geophysics, vol. 74, No. 3 (May-Jun. 2009), 2009, pp. E125-E133.
Panissod, Cedric et al., "Recent Developments in Shallow-Depth Electrical and Electrostatic Prospecting Using Mobile Arrays", Geophysics, vol. 63, No. 5 (Sep.-Oct. 1998), 1998, pp. 1542-1550.
Petiau, Gilbert, "Second Generation of Lead-Lead Chloride Electrodes for Geophysical Applications", Pure and Applied Geophysics, 157, 2000, pp. 357-382.
Shima, Hiromasa et al., "Developments of Non-Contact Data Acquisition Techniques in Electrical and Electromagnetic Explorations", Journal of Applied Geophysics, 35, 1996, pp. 167-173.
Shima, Hiromasa et al., "Fast Imaging of Shallow Resistivity Structures Using a Multichannel Capacitive Electrode System", SEG Annual Meeting, Expanded Abstracts, pp. 377-380.
Tabbagh, Alain et al., "Determination of Electrical Properties of the Ground at Shallow Depth With an Electrostatic Quadrupole: Field Trials on Archaeological Sites", Geophysical Prospecting, 41, 1993, pp. 579-597.
Thiel, David V., "On Measuring Electromagnetic Surface Impedance— Discussions with Professor James R. Wait", IEEE Transactions on Antennas and Propogation, vol. 48, No. 10, 2000, pp. 1517-1520.
Timofeeev, V.M. et al., "A New Ground Resistivity Method for Engineering and Environmental Geophysics", Proceedings of the Symposium on the Applications of Geophysics to Engineering and Environmental Problems, 1994, pp. 701-715.
Tondel, Richard et al., "Remote Reservoir Monitoring in Oil Sands: From Feasibility Study to Baseline Datasets", CSEG-CSPG-CWLS GeoConvention, Expanded Abstracts, 2013, 5 pgs.
Tondel, Richard et al., "Reservoir Monitoring in Oil Sands: Developing a Permanent Cross-Well System", SEG Annual Meeting, Expanded Abstracts, 2011, pp. 4077-4081.
Wilson, Glen et al., "Optical Electric Field Sensors Having Passivated Electrodes", Dated Feb. 28, 2014, Appl No. PCT/US2014/019228, "Optical Electric Field Sensors Having Passivated Electrodes," Filed Feb. 28, 2014, 18.
Zonge, Kenneth L. et al., "The Effect of Electrode Contact Resistance on Electric Field Measurements", 55th SEG Annual Meeting, Washington D.C., Expanded Abstracts, 1985, 8 pgs.
"Extended EP Search Report", dated Jun. 3, 2016, Appl No. PCT/US/2013067288, "Distributed Feedback Fiber Laser Strain Sensor Systems and Methods for Subsurface EM Field Monitoring," Filed Oct. 29, 2013, 8 pgs.
"International Preliminary Report on Patentability", dated Sep. 15, 2016, Appl No. PCT/US14/19228, "Optical Electric Field Sensors Having Passivated Electrodes," Filed Feb. 28, 2014, 11 pgs.
"Non-Final Office Action", dated Sep. 28, 2016, U.S. Appl. No. 14/712,758, "Fiberoptic Tuned-Induction Sensors for Downhole Use," filed May 14, 2015, 17 pgs.
Yang, Minghong, et al., "Optical fiber magnetic field sensors with TbDyFe magnetostrictive thin films as sensing materials," Yang, Minghong, et al., "Optical fiber magnetic field sensors with TbDyFe magnetostrictive thin films as sensing materials," National Engineering Laboratory for Optical Fiber Sensors, 2009, Optical Society of America, 2009, 6 pgs.

\* cited by examiner

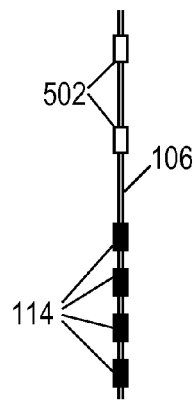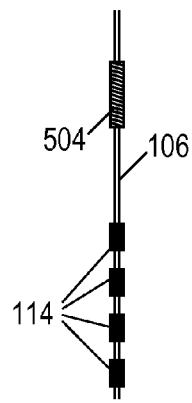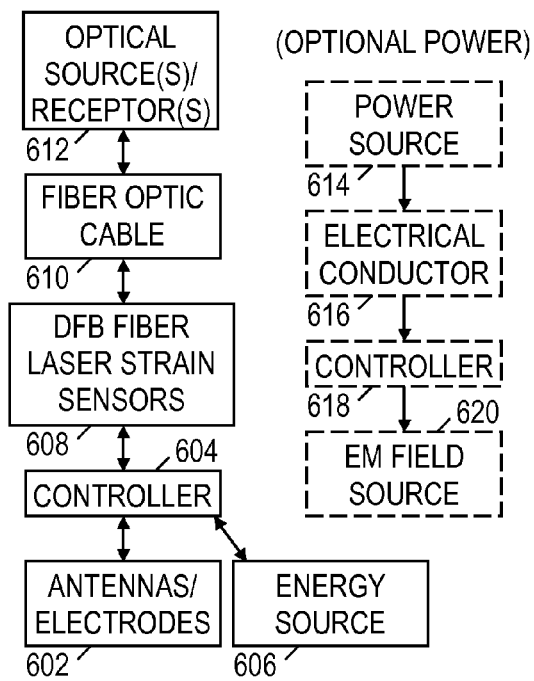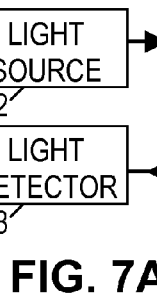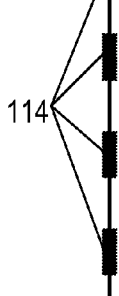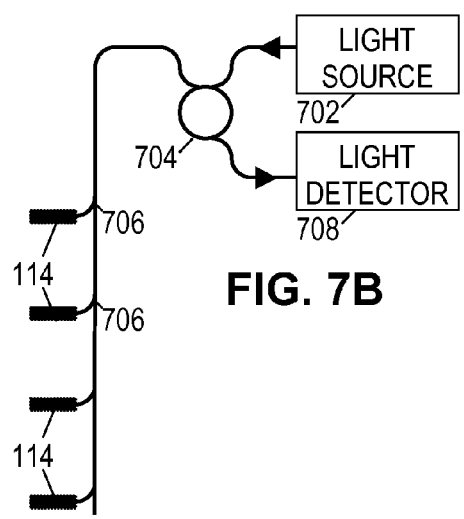

DISTRIBUTED FEEDBACK FIBER LASER STRAIN SENSOR SYSTEMS AND METHODS FOR SUBSURFACE EM FIELD MONITORING

BACKGROUND

Oil field operators drill boreholes into subsurface reservoirs to recover oil and other hydrocarbons. If the reservoir has been partially drained or if the oil is particularly viscous, the oil field operators will often stimulate the reservoir, e.g., by injecting water or other fluids into the reservoir via secondary wells to encourage the oil to move to the primary ("production") wells and thence to the surface. Other stimulation treatments include fracturing (creating fractures in the subsurface formation to promote fluid flow) and acidizing (enlarging pores in the formation to promote fluid flow).

The stimulation processes can be tailored with varying fluid mixtures, flow rates/pressures, and injection sites, but may nevertheless be difficult to control due to inhomogeneity in the structure of the subsurface formations. The production process for the desired hydrocarbons also has various parameters that can be tailored to maximize well profitability or some other measure of efficiency. Without sufficiently detailed information regarding the effects of stimulation processes on a given reservoir and the availability and source of fluid flows for particular production zones, the operator is sure to miss many opportunities for increased hydrocarbon recovery.

BRIEF DESCRIPTION OF THE DRAWINGS

Accordingly, there are disclosed herein various distributed feedback fiber laser strain sensor systems and methods for subsurface electromagnetic ("EM") field monitoring suitable for detecting an approaching flood front. In the drawings:

FIGS. 5A and 5B show illustrative combined source-sensor cable configurations.

FIG. 6 is a function block diagram of an illustrative formation monitoring system.

FIGS. 7A and 7B show illustrative multiplexing architectures for distributed EM field sensing.

Figure 1:
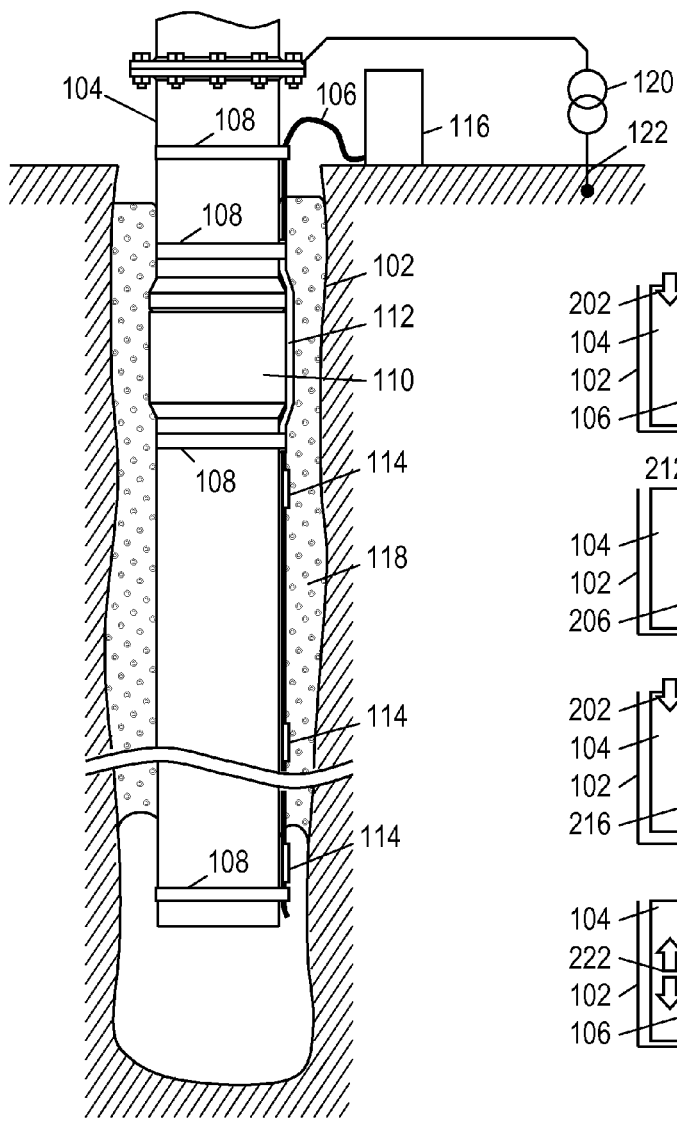
FIG. 1 shows an illustrative environment for permanent monitoring.

It should be understood, however, that the specific embodiments given in the drawings and detailed description below do not limit the disclosure. On the contrary, they provide the foundation for one of ordinary skill to discern the alternative forms, equivalents, and other modifications that are encompassed in the scope of the appended claims.

DETAILED DESCRIPTION

The following disclosure presents a distributed feedback fiber laser strain sensor technology suitable for use in permanent downhole monitoring environment to monitor subsurface electromagnetic ("EM") fields, enabling the characterization and monitoring of subsurface formation properties during stimulation and production from a reservoir, and further enabling action to optimize hydrocarbon recovery from a reservoir. One illustrative formation monitoring system has an array of electromagnetic field sensors positioned in an annular space around a well casing, the sensors being coupled to a surface interface via a fiberoptic cable. At least some of the electromagnetic field sensors correspond to distributed feedback fiber laser strain sensors. The sensor measurements in response to an injected current or another electromagnetic field source can be used to determine a resistivity distribution around the well, which in turn enables tracking of the flood front.

Turning now to the drawings, FIG. 1 shows an illustrative permanent downhole monitoring environment. A borehole 102 contains a casing string 104 with a fiber optic cable 106 secured to it by bands 108. Where the cable 106 passes over a casing joint 110, it may be protected from damage by a cable protector 112. Electromagnetic (EM) field sensors 114, including at least some distributed feedback fiber laser strain sensors, are integrated into the cable 106 to obtain EM field measurements and communicate those measurements to a surface interface 116 via fiberoptic cable 106.

The remaining annular space may be filled with cement 118 to secure the casing 104 in place and prevent fluid flows in the annular space. Fluid enters the uncemented portion of the well (or alternatively, fluid may enter through perforated portions of the well casing) and reaches the surface through the interior of the casing. Note that this well configuration is merely illustrative and not limiting on the scope of the disclosure. Many production wells are provided with multiple production zones that can be individually controlled. Similarly, many injection wells are provided with multiple injection zones that can be individually controlled.

Surface interface 116 includes an optical port for coupling the optical fiber(s) in cable 106 to a light source and a detector. The light source transmits pulses of light along the fiber optic cable to excite sensors 114. The sensors 114 retransmit the energy as laser pulses to provide measurements of field strength, field gradient, or time derivative for electrical fields and/or magnetic fields. The frequency of the laser light pulses enable the detector to responsively produce an electrical output signal indicative of the sensor measurements. In some embodiments, the frequency shift caused by the distributed feedback fiber laser strain sensor is correlated with a measure of electrical field strength or gradient. For some monitoring systems, multiple fibers are employed, in which case an additional light source and detector can be employed for each fiber, or the existing source and detector may be switched periodically between the fibers.

FIG. 1 further shows a power source 120 coupled between the casing 104 and a remote earth electrode 122. Because the casing 104 is an electrically conductive material (e.g., steel), it acts as a source electrode for current flow into the formations surrounding the borehole 102. The magnitude and distribution of the current flow will vary in accordance with the source voltage and the formation's resistivity profile. The EM field measurements by sensors 114 will thus be representative of the resistivity profile. This resistivity profile in turn is indicative of the fluids in the formation pores, enabling the reservoir fluids to be tracked over time.

The surface interface 116 may be coupled to a computer that acts as a data acquisition system and possibly as a data processing system that analyzes the measurements to derive subsurface parameters and track them over time. In some contemplated system embodiments, the computer may further control production parameters to optimize production based on the information derived from the measurements. Production parameters may include the flow rate/pressure permitted from selected production zones, flow rate/pressure in selected injection zones, and the composition of the injection fluid, each of which can be controlled via computer controlled valves and pumps.

Generally, any such computer would be equipped with a user interface that enables a user to interact with the software via input devices such as keyboards, pointer devices, and touchscreens, and via output devices such as printers, monitors, and touchscreens. The software can reside in computer memory and on nontransient information storage media. The computer may be implemented in different forms including, e.g., an embedded computer permanently installed as part of the surface interface 116, a portable computer that is plugged into the surface interface 116 as desired to collect data, a remote desktop computer coupled to the surface interface 116 via a wireless link and/or a wired computer network, a mobile phone/PDA, or indeed any electronic device having a programmable processor and an interface for I/O.

Figure 2A:
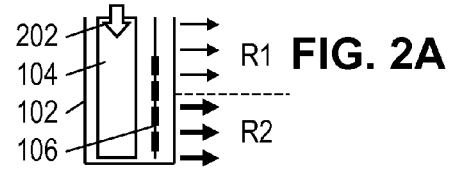
FIGS. 2A-2E show various illustrative injected-current system configurations.

FIG. 2A is a schematic representation of the system configuration in FIG. 1. It shows a borehole 102 having a casing 104 and a fiberoptic cable 106 (with an integrated sensor array) in the annular space. An injected current 202 flows along casing 104 and disperses into the surrounding formations as indicated by the arrows. Two formations are shown, labeled with their respective resistivities R1 and R2. The heavier arrows in the lower formation represent a larger current flow, indicating that resistivity R2 is lower than resistivity R1. Due to divergence pattern of the currents away from the casing, depth of investigation is typically around 5-15 feet.

Figure 2B:
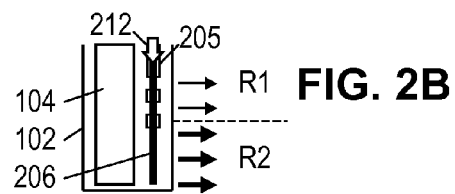

FIG. 2B shows an alternative system configuration, in which the fiberoptic cable 106 is replaced by an alternative fiberoptic cable 206 having a conductor or a conductive layer to transport an injected current 212 along the cable. The conductor may be a protective metal tube within which the fiberoptic cable is placed. Alternatively, the conductor may be a wire (e.g., a strength member) embedded in the fiberoptic cable. As another alternative, a metal coating may be manufactured on the cable to serve as the current carrier. Parts of the cable may be covered with an insulator 205 to focus the current dispersal in areas of interest. The optical fiber in cable 206 may include distributed feedback fiber laser strain sensors to enable EM field measurements as described herein.

Figure 2C:
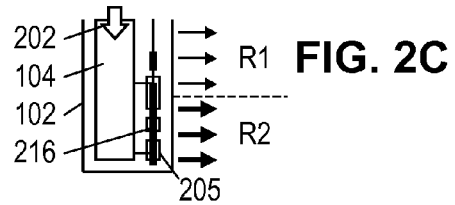

FIG. 2C shows another alternative system configuration. A conductor or conductive layer of fiberoptic cable 206 is electrically coupled to casing 104 to share the same electrical potential and contribute to the dispersal of current into the formation. Parts of the cable 206 and/or casing 104 may be covered with an insulator 205 to focus the current dispersal in areas of interest.

Figure 2D:
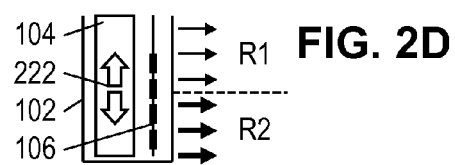

FIG. 2D shows yet another alternative system configuration. Rather than providing an injected current 202 from the surface as in FIG. 2A, the configuration of FIG. 2D provides an injected current 222 from an intermediate point along the casing 104. Such a current may be generated with an insulated electrical cable passing through the interior of casing 104 from a power source 120 (FIG. 1) to a tool that makes electrical contact at the intermediate point, e.g., via extendible arms. (An alternative approach employs a toroid around casing 104 at the intermediate point to induce current flow along the casing. The toroid provides an electric dipole radiation pattern rather than the illustrated monopole radiation pattern.)

Figure 2E:
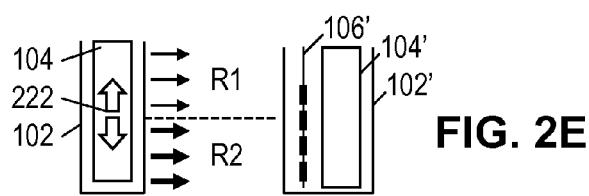

FIG. 2E shows still another alternative system configuration having a first borehole 102 and second borehole 102'. Casing 104 in the first borehole 102 carries an injected current from the surface or an intermediate point and disperses it into the surrounding formations. The second borehole 102' has a casing 104' for producing hydrocarbons and further includes a fiberoptic cable 106' with an integrated EM sensor array in the annular space around casing 104'. The EM sensors provide measurements of the fields resulting from the currents dispersed in the formations.

Figure 3A:
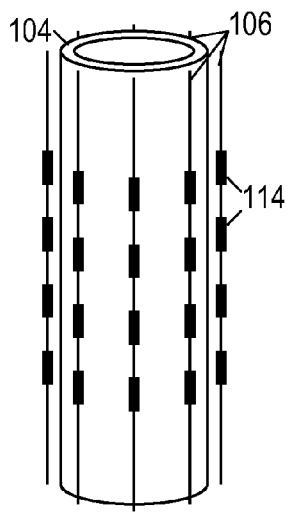
FIGS. 3A-3E show various illustrative sensing array configurations.
Figure 3B:
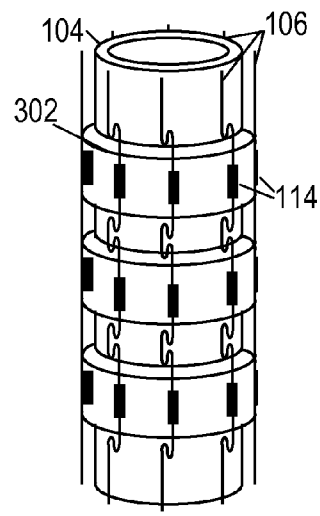
Figure 3C:
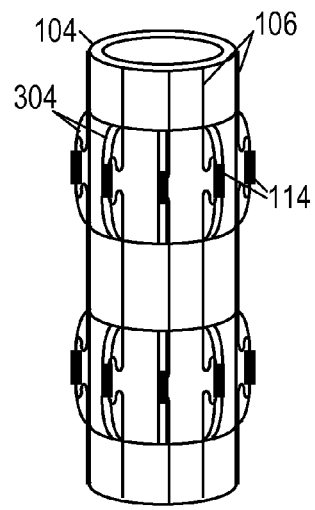

In some monitoring system embodiments, multiple fiberoptic cables 106 are employed as indicated in FIG. 3A. The azimuthal arrangement of sensors 114 enables a multi-dimensional mapping of the electromagnetic fields. In some embodiments, the sensors are mounted to the casing 104 or suspended on fins or spacers to space them away from the body of casing 104. If actual contact with the formation is desired, the sensors 114 may be mounted on swellable packers 302 as indicated in FIG. 3B. Such packers 302 expand when exposed to downhole conditions, pressing the sensors 114 into contact with the borehole wall. FIG. 3C shows the use of bow-spring centralizers 304 which also operate to press the sensors 114 into contact with the borehole walls. To minimize insertion difficulties, a restraining mechanism may hold the spring arms 304 against the casing 104 until the casing has been inserted in the borehole. Thereafter, exposure to downhole conditions or a circulated fluid (e.g., an acid) degrades the restraining mechanism and enables the spring arms to extend the sensors against the borehole wall. If made of conductive material, the spring arms may further serve as current injection electrodes, concentrating the measurable fields in the vicinity of the sensors. To further concentrate the fields, the spring arms outside the zone of interest may be insulated.

Figure 3D:
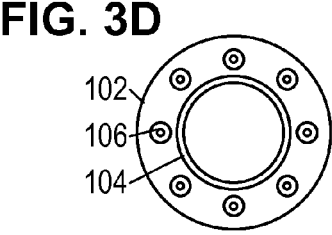
Figure 3E:
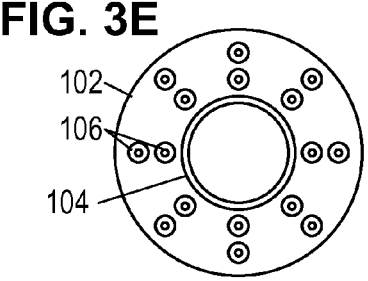

Other extension mechanisms are known in the oilfield and may be suitable for placing the sensors 114 in contact with the borehole wall or into some other desired arrangements such as those illustrated in FIGS. 3D and 3E. In FIG. 3D, the sensors are positioned near the radial midpoint of the annular region. In FIG. 3E, the sensors are placed in a spatial distribution having axial, azimuthal, and radial variation. Balloons, hydraulic arms, and projectiles are other contemplated mechanisms for positioning the sensors.

Figure 4:
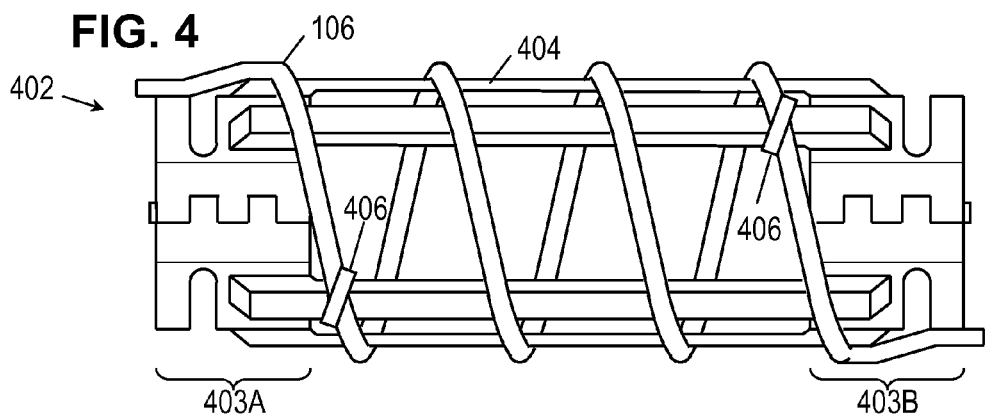
FIG. 4 shows yet another illustrative sensing array configuration.

FIG. 4 shows an illustrative fixed positioning mechanism for sensors 114. The cage 402 includes two clamps 403A, 403B joined by six ribs 404. The fiberoptic cable(s) 106 can be run along the ribs 404 or, as shown in FIG. 4, they can be wound helically around the cage. In either case, the ribs 404 provide each fiberoptic cable 106 some radial spacing from the casing 104. Cable ties 406 can be used to hold the cable in place until cementing has been completed.

In addition to providing support and communications for sensors 114, the fiberoptic cable 106 may support electrodes or antennas for generating electromagnetic fields in the absence of current injection via casing 104. FIG. 5A shows two electrodes 502 on cable 106. A voltage is generated between the two electrodes 502 to create an electric dipole radiation pattern. The response of the electromagnetic sensors 114 can then be used to derive formation parameters.

Similarly, FIG. 5B shows a solenoid antenna 504 on cable 106. A current is supplied to the solenoid coil to create a magnetic dipole radiation pattern. The response of the electromagnetic sensors 114 can then be used to derive formation parameters. In both cases the sensors are shown to one side of the source, but this is not a requirement. The source may be positioned between sensors 114 and/or one or more of the sensors may be positioned between multiple sources. The sensors 114 may even be positioned between the electrodes of an electric dipole source. Moreover, it is possible to tilt the sources and/or the sensors to provide improved directional sensitivity.

FIG. 6 provides a function block representation of an illustrative EM field monitoring system employing distributed feedback fiber laser strain sensors to convert a property of the surrounding electromagnetic field into a signal that can be sensed via an optical fiber. (Specific examples are provided further below.) As shown in FIG. 6, an energy source 606 may be provided in the form of a pair of conductors conveying power from the surface or in the form of a powerful downhole battery that contains enough energy to power the monitoring system operations for a predetermined life span. It is possible to use an energy saving scheme to turn on or off the monitoring system periodically. It is also possible to adjust the power level based on control signals received via the fiber optic cable, or based on the sensor data.

A controller 604 coupled to the energy source 606 provides power to antennas/electrodes 602 and controls the data acquisition and communication operations. In some embodiments, the controller 604 includes a microprocessor and a random access memory. Transmission and reception can be time activated, or may be based on a signal provided through the optic cable or casing. In some embodiments, multiple antennas/electrodes 602 can be activated sequentially or in parallel to inject current into a formation. Distributed feedback (DFB) fiber laser strain sensors 608 are employed to measure EM field strength or gradient. In operation, frequency shifts of light emitted by distributed feedback fiber laser strain sensors 608 along fiber optic cable 610 are correlated with a measure of EM field strength or gradient. The fiber optic cable 610 is coupled to a receiver or transceiver 612 that converts the received light signals into digital data. Stacking of sequential measurements may be used to improve signal to noise ratio.

Optionally, a power source 614 transmits power via an electrical conductor 616 to a downhole source controller 618. The source controller 618 operates an EM field source 620 such as an electric or magnetic dipole. Multiple such sources may be provided and operated in sequence or in parallel at such times and frequencies as may be determined by controller 618.

In some embodiments, time and/or frequency multiplexing is used to separate the measurements associated with each distributed feedback fiber laser strain sensor 608 along fiber optic cable 610. FIGS. 7A and 7B show illustrative multiplexing architectures for distributed EM field sensing. In FIG. 7A, a light source 702 emits light in a continuous beam. A circulator 704 directs the light along fiberoptic cable 106. The light travels along the cable 106, interacting with a series of sensors 114 capable of measuring EM field strength or gradient. For example, distributed feedback fiber laser strain sensors are configured to generate light beams, where the wavelength of laser light depends on the amount of strain applied to distributed feedback fiber laser strain sensors in an EM field. In this manner, frequency shifts caused by distributed feedback fiber laser strain sensors along fiber optic cable 610 may be correlated with a measure of EM field strength or gradient. Light from sensors 114 returns to circulator 704, which directs the light to a light detector 708. The light detector 708 separates the measurements associated with different sensors 114 via frequency multiplexing. That is, each sensor 114 generates only a narrow frequency band of the light beam, and each sensor is designed to affect a different frequency band.

In FIG. 7B, light source 702 emits light in short pulses. Each sensor 114 is coupled to the main optical fiber via a splitter 706. The splitters direct a small fraction of the light from the optical fiber to the sensor, e.g., 1% to 4%. The sensor 114 is excited by the light and responsively generates a laser pulse back to the detector 708 via the splitter, the main fiber, and the circulator. Due to the different travel distances, each pulse of light from source 702 results in a sequence of return pulses, with the first pulse arriving from the nearest sensor 114, the second pulse arriving from the second nearest sensor, etc. This arrangement enables the detector to separate the sensor measurements on a time multiplexed basis.

The arrangements of FIGS. 7A and 7B are both reflective arrangements in which the light returns along the same fiber from distributed feedback fiber laser strain sensors. In some embodiments, multiple sensors may be coupled in series on each branch of the FIG. 7B arrangement. A combination of time division and frequency division multiplexing could be used to separate the individual sensor measurements.

Thus each production well may be equipped with a permanent array of sensors distributed along axial, azimuthal and radial directions outside the casing. The sensors may be positioned inside the cement or at the boundary between cement and the formation. Each sensor is either on or in the vicinity of a fiber optic cable that serves as the communication link with the surface. Sensor transducers can directly interact with the fiber optic cables or, in some contemplated embodiments, may produce electrical signals that in turn induce thermal, mechanical (strain), acoustic or electromagnetic effects on the fiber. Each fiber optic cable may be associated with multiple EM sensors, while each sensor may produce a signal in multiple fiber optic or fiber optic cables. Even though the figures show uniformly-spaced arrays, the sensor positioning can be optimized based on geology or made randomly. In any configuration, the sensor positions can often be precisely located by monitoring the light signal travel times in the fiber.

Cement composition may be designed to enhance the sensing capability of the system. For example, configurations employing the casing as a current source electrode can employ a cement having a resistivity equal to or smaller than the formation resistivity.

The sensors 114 referenced above preferably employ fully optical means to measure EM fields and EM field gradients and transfer the measurement information through optical fibers to the surface for processing to extract the measurement information. The sensors will preferably operate passively, though in many cases sensors with minimal power requirements can be powered from small batteries. The minimization of electronics or downhole power sources provides a big reliability advantage. Because multiple sensors can share a single fiber, the use of multiple wires with associated connectors and/or multiplexers can also be avoided, further enhancing reliability while also reducing costs.

Figure 8A:
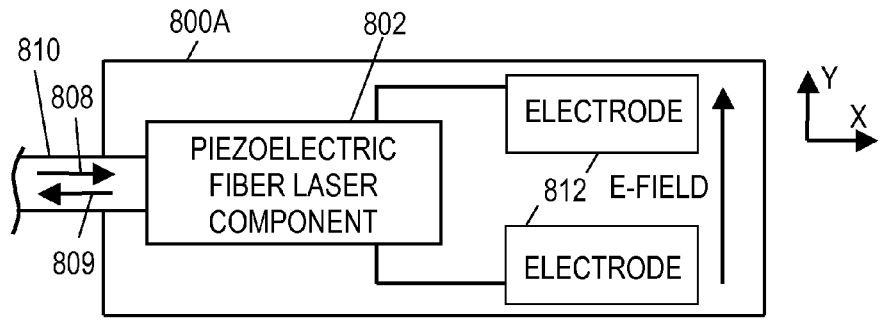
FIGS. 8A and 8B show various illustrative distributed feedback fiber laser strain sensor configurations.
Figure 8B:
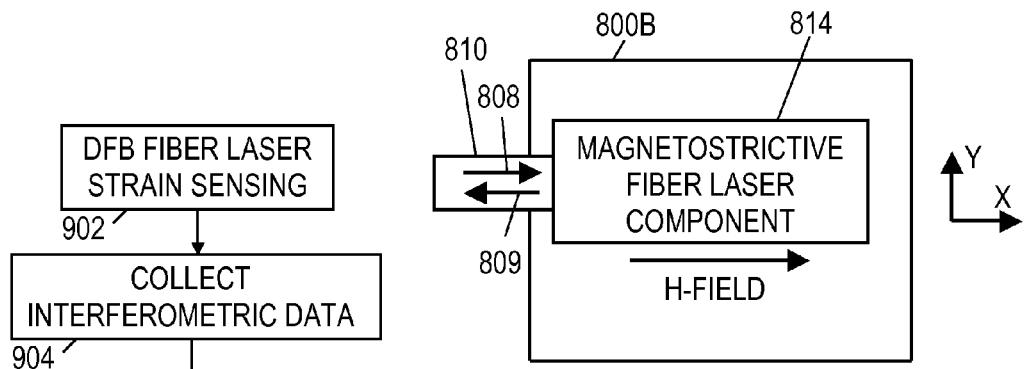

FIGS. 8A and 8B show illustrative distributed feedback fiber laser strain sensor configurations. In FIG. 8A, distributed feedback fiber laser strain sensor 800A is configured as an E-field sensor. As shown, the distributed feedback fiber laser strain sensor 800A is positioned along a fiber optic cable 810 and includes a piezoelectric fiber laser component 802 coupled to electrodes 812. The electrodes 812 are configured to output a voltage level corresponding to an electromagnetic field strength or gradient to the piezoelectric fiber laser component 802.

In some embodiments, the piezoelectric fiber laser component 802 includes piezoelectric material responsive to voltage variation and bonded to a doped fiber portion within which a Bragg grating is formed. Each end of the doped fiber portion is spliced to a passive fiber. When a pump beam 808 traveling along cable 810 arrives to piezoelectric fiber laser component 802, a laser emission beam 809 is generated by the piezoelectric fiber laser component 802 and is output to the cable 810. The wavelength of the emission beam 809 depends on various factors such as the pitch of the Bragg grating and the doping material used. The wavelength of the pump beam 808 also may be selected in accordance with the doping material used for the piezoelectric fiber laser component 802.

In the presence of an E-field, the electrodes 812 apply a voltage to the piezoelectric material of the piezoelectric fiber laser component 802, which causes the piezoelectric material to expand or contract in one or more directions. Because the piezoelectric material is bonded to the fiber laser, a corresponding strain to the fiber laser results, which affects the grating pitch. Accordingly, the wavelength of the emission beam 809 can be correlated to the amount of strain applied to the laser fiber due to the E-field strength or gradient. In some embodiments, the distributed feedback fiber laser strain sensor 800A includes or is coupled to an imbalanced interferometer (e.g., a Mach-Zender interferometer) to convert wavelength variations of the emission beam 809 into phase or amplitude variations. With the distributed feedback fiber laser strain sensor 800A, strain as low as 118 fε/Hz$^{1/2}$ (ε is the deformation per unit of the original length) can be detected. In an example embodiment, a piezoelectric cylinder 50 mm in diameter and bonded to a 45 mm fiber laser can measure electric fields as low as 50 μV/m.

In FIG. 8A, the electrodes 812 are configured to detect a particular E-field orientation (along the Y direction shown for FIG. 8A). To detect another E-field orientation, the electrodes 812 may be oriented differently, additional electrodes 812 may be employed, or nearby distributed feedback fiber laser strain sensors 800A may be oriented differently.

In one example embodiment, the piezoelectric fiber laser component 802 may include a length of single mode, photosensitive erbium-doped fiber within which a Bragg grating is formed. A distributed-feedback structure with a quarter-wave configuration is formed with a single π phase shift in the center of the grating. For erbium (Er)-doped fiber, the wavelength of the pump beam 808 may be around 980 nm or 1480 nm, while the wavelength of the emission beam 809 is determined by the pitch of the grating and can be set to within a window of approximately 1525-1560 nm. With this configuration, the distributed feedback fiber laser strain sensor 800A supports a single fundamental mode, the center of which is located about the phase shift (thus emitting a fundamental frequency).

In alternative embodiments, the piezoelectric fiber laser component 802 may employ other rare elements such as thulium (Tm), dysprosium (Dy), or praseodymium (Pr) neodymium (Nd), thorium (Th), holmium (Ho), ytterbium (Yb) for doping a fiber to construct a fiber laser sensor. Each doping element provides the fiber laser with unique characteristics. As examples, a fiber laser with praseodymium doping uses a pump beam at approximately 1 μm and lases at 1.3 μm, a fiber laser with thulium doping uses a pump beam at approximately 1565 nm and lases at 1943 nm. Table 1 shows different configuration options for fiber lasers.

TABLE 1

| Ion | Host material (glass) | Emission wavelengths |
|---|---|---|
| erbium (Er$^{3+}$) | Silicate, phosphate | 1.5-1.6 μm, 2.7 μm, 0.55 μm |
| thulium (Tm$^{3+}$) | Silicate, germinate, flouride | 1.7-2.1 μm, 1.45-1.53 μm, 0.48 μm, 0.8 μm |
| dysprosium (Dy$^{3+}$) | Silicate, flouride | 2.9 μm |
| praseodymium (Pr$^{3+}$) | Silicate, flouride | 1.3 μm, 0.635 μm, 0.6 μm, 0.52 μm, 0.49 μm |
| neodymium (Nd$^{3+}$) | Silicate, phosphate | 1.03-1.1 μm, 0.9-0.95 μm, 1.32-1.35 μm |
| thorium (Th$^{3+}$) | Silicate, flouride | 0.475 μm, 0.51 μm |
| holmium (Ho$^{3+}$) | Silicate, flourozirconate | 2.1 μm, 2.9 μm |
| ytterbium (Yb$^{3+}$) | Silicate | 1.0-1.1 μm |

As shown in Table 1, the emission wavelengths for different fiber laser vary depending on the doping material and host material. The examples given in Table 1 are not intended to limit the disclosed distributed feedback fiber laser strain sensors to any particular configuration or wavelength emission. Further, in some embodiments, the distributed feedback fiber laser strain sensor 800A has multiple dopings and is responsive to different pump beam wavelengths by generating a different emission beam.

In FIG. 8B, distributed feedback fiber laser strain sensor 800B is configured as an H-field sensor. As shown, the distributed feedback fiber laser strain sensor 800B is positioned along fiber optic cable 810 and includes a magnetostrictive fiber laser component 814. The magnetostrictive fiber laser component 814 includes a magnetostrictive material responsive to magnetic fields and bonded to a doped fiber portion within which a Bragg grating is formed. As described previously, the doping material may be selected from thulium (Tm), dysprosium (Dy), or praseodymium (Pr) neodymium (Nd), thorium (Th), holmium (Ho), ytterbium (Yb), or combinations thereof. Each end of the doped fiber portion is spliced to a passive fiber. When a pump beam 808 traveling along cable 810 arrives to magnetostrictive fiber laser component 814, a laser emission beam 809 is generated by the magnetostrictive fiber laser component 814 and is output to the cable 810. The wavelength of the emission beam 809 depends on various factors such as the pitch of the Bragg grating and the doping material used. The wavelength of the pump beam 808 also may be selected in accordance with the doping material used for the magnetostrictive fiber laser component 814.

In the presence of an H-field, the magnetostrictive material of the magnetostrictive fiber laser component 814 expands or contracts in one or more directions. Because the magnetostrictive material is bonded to the fiber laser, a corresponding strain to the fiber laser results, which affects the grating pitch. Accordingly, the wavelength of the emission beam 809 can be correlated to the amount of strain applied to the laser fiber due to the H-field strength or gradient. In some embodiments, the distributed feedback fiber laser strain sensor 800B includes or is coupled to an imbalanced interferometer (e.g., a Mach-Zender interferometer) to convert wavelength variations of the emission beam 809 into phase or amplitude variations.

In FIG. 8B, the magnetostrictive fiber laser component 814 is configured to detect a particular H-field orientation (along the X direction shown for FIG. 8A). To detect another H-field orientation, the magnetostrictive fiber laser component 802 may be oriented differently, or nearby distributed feedback fiber laser strain sensors 800B may be oriented differently.

In one example embodiment, the doped fiber laser is bonded to a metglas strip that operates as the magnetostrictive material. For a metglas strip of size 45 mm×5 mm×25 µm, magnetic field strengths as low as 15 µA/m can be detected. This level of sensitivity enables detections depths (e.g., for waterfront floods) of approximately 30 feet away from the wellbore in which the monitoring system resides. The magnetic field detection mechanism provided the distributed feedback fiber laser strain sensor 800B is higher resolution and has a smaller footprint than other magnetostrictive magnetic field sensors.

The foregoing sensors are merely illustrative examples and not limiting on the sensors or configurations that can be employed in the disclosed systems and methods. Distributed feedback fiber laser strain sensors as described herein may be employed to provide measure EM field strength/gradient. The emission beams generated by distributed feedback fiber laser strain sensors are multiplexed and demodulated as needed to decode measurement information. Distributed feedback fiber laser strain sensors as described herein may be single-mode or multi-mode. Arrays of distributed feedback fiber laser strain sensors 800A and/or 800B may be positioned in a wellbore and oriented differently to detect EM fields. The measurements from such sensors are encoded in the output light and travel through one or more fibers to a processing unit located at the surface. In the processing unit, the EM field measurements are extracted. The EM field measurements may be used to derive subsurface resistivity maps, conductivity maps, and/or fluid (e.g., waterfront) maps. Such maps may be used by a control system or operator to control a multi-valve production system installed in the same wellbore as the monitoring system.

Figure 9:
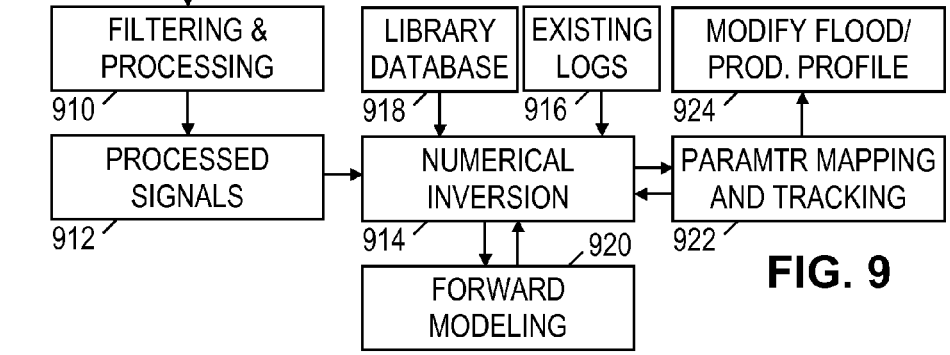
FIG. 9 is a signal flow diagram for an illustrative formation monitoring method.

FIG. 9 provides an overview of illustrative formation monitoring methods. A controlled electromagnetic field source generates a subsurface electromagnetic field. While it is possible for this field to be a fixed (DC) field, it is expected that better measurements will be achievable with an alternating current (AC) field having a frequency in the range of 1-1000 Hz. In block 902, distributed feedback fiber laser strain sensors convert the selected characteristic of the electromagnetic field into an emission beam wavelength. For energy efficiency, sensors can be activated and measurements can be taken periodically. This enables long-term monitoring applications (such as water-flood movements), as well as applications where only small number of measurements are required (fracturing). For further efficiency, different sets of sensors may be activated in different periods.

In block 904, data corresponding to the emission beams wavelengths output by the distributed feedback fiber laser strain sensors is collected. In block 906, the surface receiver extracts the represented EM field measurements and associates them with sensor positions. The measurements are repeated and collected as a function of time in block 908. In block 910, a data processing system filters and processes the measurements to calibrate them and improve signal to noise ratio. Suitable operations include filtering in time to reduce noise; averaging multiple sensor data to reduce noise; taking the difference or the ratio of multiple voltages to remove unwanted effects such as a common voltage drift due to temperature; other temperature correction schemes such as a temperature correction table; calibration to known/expected resistivity values from an existing well log; and array processing (software focusing) of the data to achieve different depth of detection or vertical resolution.

In block 912, the processed signals are stored for use as inputs to a numerical inversion process in block 914. Other inputs to the inversion process are existing logs (block 916) such as formation resistivity logs, porosity logs, etc., and a library of calculated signals 918 or a forward model 920 of the system that generates predicted signals in response to model parameters, e.g., a two- or three-dimensional distribution of resistivity. As part of generating the predicted signals, the forward model determines a multidimensional model of the subsurface electromagnetic field. All resistivity, electric permittivity (dielectric constant) or magnetic permeability properties of the formation can be measured and modeled as a function of time and frequency. The parameterized model can involve isotropic or anisotropic electrical (resistivity, dielectric, permeability) properties. More complex models can be employed so long as sufficient numbers of sensor types, positions, orientations, and frequencies are employed. The inversion process searches a model parameter space to find the best match between measured signals 912 and generated signals. In block 922 the parameters are stored and used as a starting point for iterations at subsequent times.

Effects due to presence of tubing, casing, mud and cement can be corrected by using a-priori information on these parameters, or by solving for some or all of them during the inversion process. Since all of these effects are mainly additive and they remain the same in time, a time-lapse measurement can remove them. Multiplicative (scaling) portion of the effects can be removed in the process of calibration to an existing log. All additive, multiplicative and any other non-linear effect can be solved for by including them in the inversion process as a parameter.

The motion of reservoir fluid interfaces can be derived from the parameters and used as the basis for modifying the production profile in block 924. Production from a well is a dynamic process and each production zone's characteristics may change over time. For example, in the case of water flood injection from a second well, water front may reach some of the perforations and replace the existing oil production. Since flow of water in formations is not very predictable, stopping the flow before such a breakthrough event requires frequent monitoring of the formations.

Profile parameters such as flow rate/pressure in selected production zones, flow rate/pressure in selected injection zones, and the composition of the injection fluid, can each be varied. For example, injection from a secondary well can be stopped or slowed down when an approaching water flood is detected near the production well. In the production well, production from a set of perforations that produce water or that are predicted to produce water in relatively short time can be stopped or slowed down.

We note here that the time lapse signal derived from the receiver signals is expected to be proportional to the contrast between formation parameters. Hence, it is possible to enhance the signal created by an approaching flood front by enhancing the electromagnetic contrast of the flood fluid relative to the connate fluid. For example, a high magnetic permeability, or electrical permittivity or conductivity fluid can be used in the injection process in the place of or in conjunction with water. It is also possible to achieve a similar effect by injecting a contrast fluid from the wellbore in which monitoring is taking place, but this time changing the initial condition of the formation.

The disclosed systems and methods may offer a number of advantages. They may enable continuous time-lapse monitoring of formations including a water flood volume. They may further enable optimization of hydrocarbon production by enabling the operator to track flows associated with each perforation and selectively block water influxes. Precise localization of the sensors is not required during placement since that information can be derived afterwards via the fiber optic cable. Casing source embodiments do not require separate downhole EM sources, significantly decreasing the system cost and increasing reliability.

Numerous other variations and modifications will become apparent to those skilled in the art once the above disclosure is fully appreciated. For example, this sensing system can be used for cross well tomography with EM transmitters are placed in one well and EM fields being measured in surrounding wells which can be drilled at an optimized distance with respect to each other and cover the volume of the reservoir from multiple sides for optimal imaging. It is intended that the following claims be interpreted to embrace all such variations and modifications where applicable.

What is claimed is:

1. A subsurface electromagnetic field monitoring system that comprises:
   a first and second array of electromagnetic field sensors in a borehole;
   at least one fiberoptic cable that optically communicates measurements from the first and second array of electromagnetic field sensors to a surface interface; and
   a computer that determines a formation resistivity or conductivity mapping from the measurements,
   wherein the first and second arrays of electromagnetic field sensors comprise a respective first and second distributed feedback fiber laser strain sensor with electromagnetic field sensitivity,
   wherein the first distributed feedback fiber laser strain sensor comprises a magnetostrictive material bonded to a first distributed feedback fiber laser and the second distributed feedback fiber laser strain sensor comprises a piezoelectric material bonded to a second distributed feedback fiber laser, the piezoelectric material is coupled to at least two electrodes, and
   wherein each distributed feedback fiber laser strain sensor receives a pump beam and generates a respective light beam having a wavelength that depends on a respective amount of strain applied to a respective doped fiber portion of the respective distributed feedback fiber laser by the magnetostrictive and piezoelectric material in response to at least one subsurface electromagnetic field;
   wherein the magnetostrictive material is a strip and the piezoelectric material is a cylinder; and; and wherein the magnetostrictive and piezoelectric material applies the strain to the respective doped fiber portion by expanding and contracting in response to presence of the at least one subsurface electromagnetic field, wherein the at least one subsurface electromagnetic field is received between the at least two electrodes coupled to the piezoelectric material.

2. The system of claim 1, wherein a data processing system correlates a wavelength shift caused by the first or second distributed feedback fiber laser strain sensor with a measure of electrical field strength or gradient.

3. The system of claim 1, wherein a data processing system correlates a wavelength shift caused by the first or second distributed feedback fiber laser strain sensor with a measure of magnetic field strength or gradient.

4. The system of claim 1, wherein the first or second distributed feedback fiber laser comprises an erbium-doped fiber within which a Bragg grating is formed, and wherein the system further comprises a pump laser configured to provide a pump beam compatible with the erbium-doped fiber.

5. The system of claim 1, wherein the first or second distributed feedback fiber laser comprises a thulium-doped fiber within which a Bragg grating is formed, and wherein the system further comprises a pump laser configured to provide a pump beam compatible with the thulium-doped fiber.

6. The system of claim 1, wherein the first or second distributed feedback fiber laser comprises a dysprosium-doped fiber within which a Bragg grating is formed, and wherein the system further comprises a pump laser configured to provide a pump beam compatible with the dysprosium-doped fiber.

7. The system of claim 1, wherein the first or second distributed feedback fiber laser comprises a praseodymium-doped fiber within which a Bragg grating is formed, and wherein the system further comprises a pump laser configured to provide a pump beam compatible with the praseodymium-doped fiber.

8. The system of claim 1, wherein the first or second distributed feedback fiber laser comprises a fiber doped with at least one of erbium, thulium, dysprosium, praseodymium, neodymium, thorium, holmium, and ytterbium within which a Bragg grating is formed, and wherein the system further comprises a pump laser configured to provide a pump beam compatible with the doped fiber.

9. The system of claim 1, further comprising a controller in communication with a data processing system, wherein the controller receives a multi-dimensional model of formation resistivity or conductivity determined by the data processing system based on the measurements, and wherein the controller controls a subsurface multi-valve system in response to the received multi-dimensional model.

10. The system of claim 1, further comprising a controller in communication with a data processing system, wherein the controller receives a fluid mapping determined by the data processing system based on the measurements, and wherein the controller controls a subsurface multi-valve system in response to the received fluid mapping.

11. A subsurface electromagnetic field monitoring method that comprises:
   receiving measurements from a first and second array of electromagnetic field sensors via a fiberoptic cable in a borehole; and
   determining, by a computer, a formation resistivity or conductivity mapping based on the measurements,
   wherein the first and second arrays of electromagnetic field sensors comprise a respective first and second distributed feedback fiber laser strain sensor with electromagnetic field sensitivity,
   wherein the first distributed feedback fiber laser strain sensor comprises a magnetostrictive material bonded to a first distributed feedback fiber laser and the second distributed feedback fiber laser strain sensor comprises a piezoelectric material bonded to a second distributed feedback fiber laser, the piezoelectric material is coupled to at least two electrodes, and
   wherein each distributed feedback fiber laser strain sensor receives a pump beam and generates a respective light beam having a wavelength that depends on a respective amount of strain applied to a respective doped fiber portion of the respective distributed feedback fiber laser by the magnetostrictive and piezoelectric material in response to at least one subsurface electromagnetic field;

wherein the magnetostrictive material is a strip and the piezoelectric material is a cylinder; and wherein the magnetostrictive and piezoelectric material applies the strain to the respective doped fiber portion by expanding and contracting in response to presence of the at least one subsurface electromagnetic field, wherein the at least one subsurface electromagnetic field is received between the at least two electrodes coupled to the piezoelectric material.

12. The method of claim 11, further comprising controlling a subsurface multi-valve system based on the formation resistivity or conductivity mapping.

13. The method of claim 11, further comprising estimating a fluid front location based on the measurements, and controlling a subsurface multi-valve system based on the estimated fluid front location.

14. The method of claim 11, further comprising positioning the first or second distributed feedback fiber laser strain sensor in an annular space between a casing and a wall of said borehole.

15. The method of claim 11, further comprising correlating a frequency shift caused by the first or second distributed feedback fiber laser strain sensor to a measure of magnetic field strength or gradient.

16. The method of claim 11, further comprising correlating a frequency shift caused by the first or second distributed feedback fiber laser strain sensor to a measure of electric field strength or gradient.

17. The method of claim 11, further comprising bonding a magnetostrictive or piezoelectric material to an erbium-doped fiber within which a Bragg grating is formed, and providing a pump beam compatible with the erbium-doped fiber.

18. The method of claim 11, further comprising bonding a magnetostrictive or piezoelectric material to a thulium-doped fiber within which a Bragg grating is formed, and providing a pump beam compatible with the thulium-doped fiber.

19. The method of claim 11, further comprising bonding a magnetostrictive or piezoelectric material to a dysprosium-doped fiber within which a Bragg grating is formed, and providing a pump beam compatible with the dysprosium-doped fiber.

20. The method of claim 11, further comprising bonding a magnetostrictive or piezoelectric material to a praseodymium-doped fiber within which a Bragg grating is formed, and providing a pump beam compatible with the praseodymium-doped fiber.

21. The method of claim 11, further comprising bonding a magnetostrictive or piezoelectric material to a fiber doped with at least one of erbium, thulium, dysprosium, praseodymium, neodymium, thorium, holmium, and ytterbium within which a Bragg grating is formed, and providing a pump beam compatible with the doped fiber.

22. The system of claim 1, wherein the array of electromagnetic field sensors comprises a plurality of distributed feedback fiber laser strain sensors with electromagnetic field sensitivity, wherein the plurality of distributed feedback fiber lasers strain sensors includes the first distributed feedback fiber laser strain sensor and the second distributed feedback fiber laser strain sensor; and wherein the light beam generated by a given distributed feedback fiber laser strain sensor is separated in time or frequency from other light beams generated by other distributed feedback fiber laser strains sensors of the plurality of distributed feedback laser strain sensors.

23. The system of claim 22, wherein the light beam generated by the given distributed feedback fiber laser strain sensor is separated in time or frequency from other light beams generated by other distributed feedback fiber laser strain sensors of the plurality of distributed feedback laser strain sensors comprises when the pump beam is a continuous beam a frequency of the light beam generated by the given distributed feedback fiber laser strain is separated in frequency at the detector with other light beams generated by the other distributed feedback fiber laser strain sensors of the plurality of distributed feedback laser strain sensors.

24. The system of claim 22, wherein the light beam generated by the given distributed feedback fiber laser strain sensor is separated in time or frequency from other light beams generated by other distributed feedback fiber laser strain sensors of the plurality of distributed feedback laser strain sensors comprises when the pump beam is a pulsed beam, the light beam generated by the given distributed feedback fiber laser strain sensor is separated in time at the detector with other light beams generated by the other distributed feedback fiber laser strain sensors.

25. The method of claim 11, wherein the array of electromagnetic field sensors comprises a plurality of distributed feedback fiber laser strain sensors with electromagnetic field sensitivity, wherein the plurality of distributed feedback fiber lasers sensors includes the first distributed feedback fiber laser strain sensor and the second distributed feedback fiber laser strain sensor; and wherein the light beam generated by a given distributed feedback fiber laser strain sensor is separated in time or frequency from other light beams generated by other distributed feedback fiber laser strains sensors of the plurality of distributed feedback laser strain sensors.

26. The method of claim 25, wherein the light beam generated by the given distributed feedback fiber laser strain sensor is separated in time or frequency from other light beams generated by other distributed feedback fiber laser strain sensors of the plurality of distributed feedback laser strain sensors comprises when the pump beam is a continuous beam a frequency of the light beam generated by the given distributed feedback fiber laser strain is separated in frequency at the detector with other light beams generated by the other distributed feedback fiber laser strain sensors of the plurality of distributed feedback laser strain sensors.

27. The method of claim 25, wherein the light beam generated by the given distributed feedback fiber laser strain sensor is separated in time or frequency from other light beams generated by other distributed feedback fiber laser strain sensors of the plurality of distributed feedback laser strain sensors comprises when the pump beam is a pulsed beam, the light beam generated by the given distributed feedback fiber laser strain sensor is separated in time at the detector with other light beams generated by the other distributed feedback fiber laser strain sensors.

28. The system of claim 1, wherein the magnetostrictive and piezoelectric material applies the strain to the respective doped fiber portion by expanding and contracting in response to only presence of the at least one subsurface electromagnetic field and without a current being applied to the magnetostrictive and piezoelectric material.

29. The method of claim 11, wherein the magnetostrictive and piezoelectric material applies the strain to the respective doped fiber portion by expanding and contracting in response to only presence of the at least one subsurface electromagnetic field and without a current being applied to the magnetostrictive and piezoelectric material.

* * * * *